United States Patent
Lee et al.

(10) Patent No.: US 9,699,478 B2
(45) Date of Patent: Jul. 4, 2017

(54) INVERSE TRANSFORM METHOD AND APPARATUS FOR VIDEO CODEC

(71) Applicant: Foundation of Soongsil University-Industry Cooperation, Seoul (KR)

(72) Inventors: Seong-Soo Lee, Seoul (KR); Jong-Bae Lee, Seoul (KR)

(73) Assignee: Foundation of Soongsil University-Industry Cooperation, Seoul (KR)

(*) Notice: Subject to any disclaimer, the term of this patent is extended or adjusted under 35 U.S.C. 154(b) by 235 days.

(21) Appl. No.: 14/585,425

(22) Filed: Dec. 30, 2014

(65) Prior Publication Data
US 2015/0245027 A1    Aug. 27, 2015

(30) Foreign Application Priority Data
Feb. 25, 2014    (KR) ........................ 10-2014-0022060

(51) Int. Cl.
*H04N 19/60*    (2014.01)
*H04N 19/42*    (2014.01)

(52) U.S. Cl.
CPC ............. *H04N 19/60* (2014.11); *H04N 19/42* (2014.11)

(58) Field of Classification Search
CPC .............................. H04N 19/60; H04N 19/42
USPC .................................................... 375/240.18
See application file for complete search history.

(56) References Cited

U.S. PATENT DOCUMENTS

| | | | | |
|---|---|---|---|---|
| 5,673,214 A | * | 9/1997 | Kim | ........................ G06T 9/007 382/250 |
| 6,507,673 B1 | * | 1/2003 | Wang | ................... H04N 19/122 375/240.02 |
| 2006/0072846 A1 | * | 4/2006 | Song | ...................... H04N 19/61 382/276 |
| 2012/0177108 A1 | * | 7/2012 | Joshi | ..................... G06F 17/147 375/240.03 |
| 2013/0329780 A1 | * | 12/2013 | Park | ...................... H04N 19/42 375/240.2 |

FOREIGN PATENT DOCUMENTS

| | | |
|---|---|---|
| KR | 10-2006-0030639 A | 4/2006 |
| KR | 10-2013-0137951 A | 12/2013 |

* cited by examiner

*Primary Examiner* — William C Vaughn, Jr.
*Assistant Examiner* — Jae N Noh
(74) *Attorney, Agent, or Firm* — Mintz Levin Cohn Ferris Glovsky and Popeo, P.C.; Kongsik Kim; Jonathon Western

(57) ABSTRACT

An inverse transform method and apparatus for a video codec are disclosed. The inverse transformer can include: a first inverse transform unit configured to perform an inverse transform operation on an even column portion of a 2n×2n block or an n×n block sharing inverse transform coefficients; and a second inverse transform unit configured to store coefficients according to a first input mode and a second input mode and configured to select coefficients according to input mode and multiply the selected coefficients with an input value to perform an inverse transform of an odd column portion of a 2n×2n block or an n×n block.

6 Claims, 6 Drawing Sheets

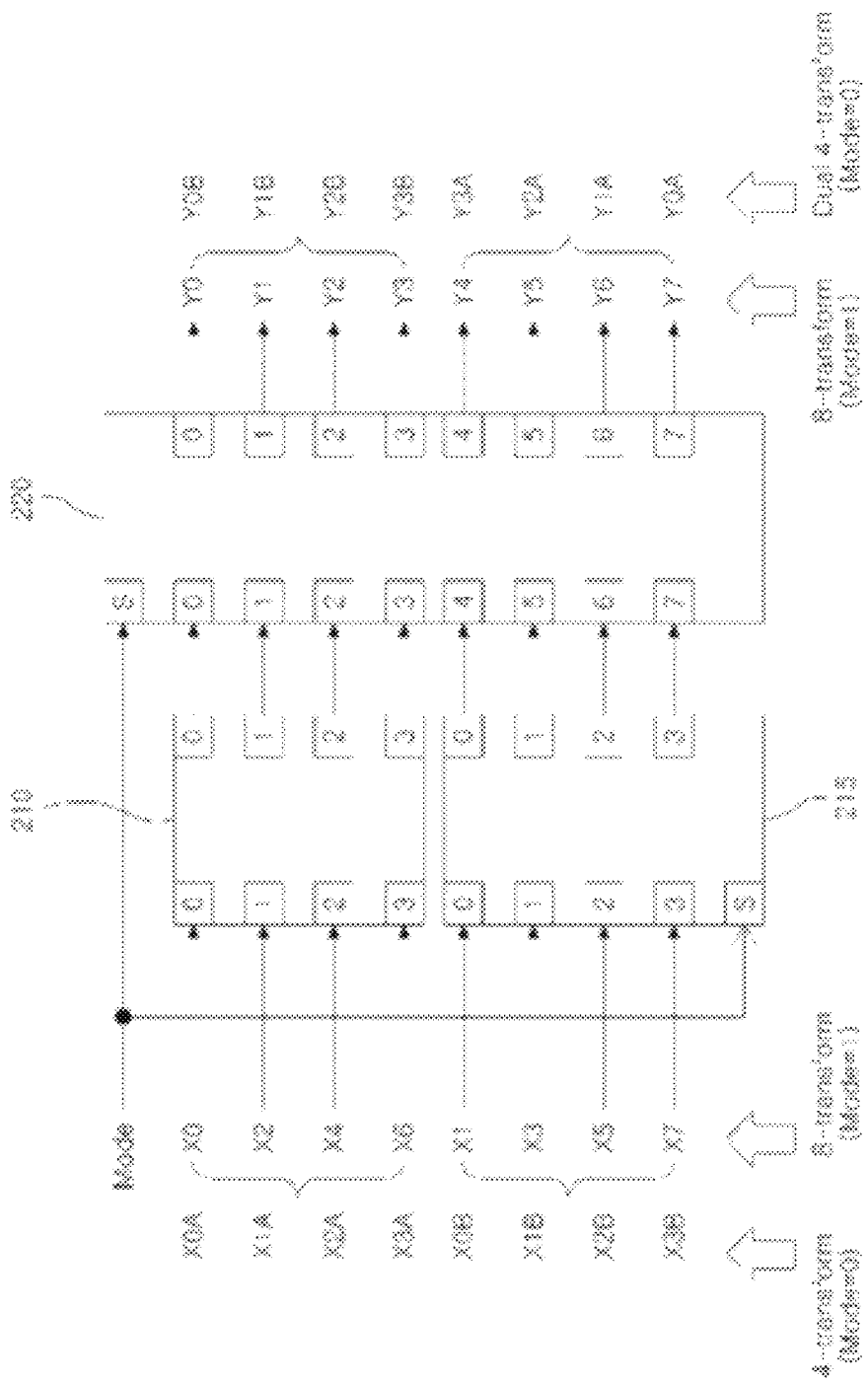

INVERSE TRANSFORM METHOD AND APPARATUS FOR VIDEO CODEC

CROSS-REFERENCE TO RELATED APPLICATIONS

This application claims the benefit of Korean Patent Application No. 10-2014-0022060, filed on Feb. 25, 2014, the disclosure of which is incorporated herein by reference in its entirety.

TECHNICAL FIELD

The present invention relates to a video codec, more particularly to an inverse transform method and apparatus for a video codec.

RELATED ART

The existing standard for video compression, H.264/AVC, is widely being used in various fields, from video conferencing to digital multimedia broadcasting. However, with the development in recent times of ultra-high quality and ultra-high resolution image services, such as UHDTV (ultra-high definition TV), the need for processing 4 k and even 8 k images has arisen, and in this context, HEVC (high efficiency video coding) was presented.

A feature of the HEVC standard is a recursive architecture, in which the same coefficients apply to the even parts of an upper-size block and the entirety of a lower-size block.

FIG. 1A and FIG. 1B schematically illustrate the structure of a conventional HEVC inverse transformer.

In a HEVC inverse transform, the entire lower-size block is identical with the even part of the upper-size block, so that an 8×8 inverse transformer can be used to perform both an 8×8 inverse transform and a 4×4 inverse transform. When processing both an 8×8 inverse transform and a 4×4 inverse transform using one 8×8 inverse transformer, a conventional HEVC inverse transformer may operate as in FIG. 1A for the 8×8 inverse transform and operate as in FIG. 1B for the 4×4 inverse transform.

That is, whereas the 8×8 inverse transform can process eight pixels simultaneously, the 4×4 inverse transform can process only four pixels simultaneously, so that when an 8×8 inverse transformer is used to process both the 4×4 inverse transform and the 8×8 inverse transform, the amount of time required for processing a frame with the 4×4 inverse transform may be twice the amount of time required for processing an 8×8 inverse transform.

SUMMARY

An aspect of the invention is to provide an inverse transform method and apparatus for a video codec that can perform inverse transforms for an upper-size block and a lower-size block with a single inverse transform module.

Also, an aspect of the invention is to provide an inverse transform method and apparatus for a video codec that can reduce the hardware chip area by 12% by performing inverse transforms for an upper-size block and a lower-size block with a single inverse transform module.

One aspect of the invention provides an inverse transform apparatus for a video codec that can perform inverse transforms for an upper-size block and a lower-size block with a single inverse transform module.

An embodiment of the invention can provide an inverse transformer capable of performing inverse transforms for a 2n×2n block and an n×n block (where n is a natural number) with a single module, where the inverse transformer can include: a first inverse transform unit configured to perform an inverse transform operation on an even column portion of a 2n×2n block or an n×n block sharing inverse transform coefficients; and a second inverse transform unit configured to store coefficients according to a first input mode and a second input mode and configured to select coefficients according to input mode and multiply the selected coefficients with an input value to perform an inverse transform of an odd column portion of a 2n×2n block or an n×n block.

The second inverse transform unit can include a coefficient register configured to store an n number of coefficients for each of the first input mode and the second input mode; a switch configured to selectively output the n number of coefficients for the first input mode or the second input mode from the coefficient register according to input mode; an n number of array multipliers configured to multiply the n number of coefficients selectively outputted by the switch with the input value and output intermediate values at an n-th point; and an adder/subtractor unit configured to add or subtract the intermediate values an m number of times (where m is a natural number) to output a final inverse transform result, where the coefficient register, the switch, the array multipliers, and the adder/subtractor unit are included in a single module.

The input mode can be either a first input mode for an inverse transform of a 2n×2n block or a second input mode for an inverse transform of an n×n block.

The adder/subtractor unit can include a multiple number of adders and adder/subtractors arranged in m columns, where the adder/subtractor can perform an addition or a subtraction operation according to the input mode of the switch.

The adder/subtractor unit can have a first adder, a second adder, a third adder, and a fourth adder/subtractor arranged in a first column for adding or subtracting the intermediate values outputted at the n-th points by a first and a second array multiplier, and can have a fifth adder/subtractor, a sixth adder, a seventh adder, and an eighth adder arranged for adding or subtracting the intermediate values outputted at the n-th points by a third and a fourth array multiplier.

The n-th adder or adder/subtractor of the first column can add or subtract the intermediate values outputted at the n-th points of the first and the second array multiplier or the third and the fourth array multiplier as a pair and can output a result to a designated adder or adder/subtractor of the second column.

The second column of the adder/subtractor unit can include a ninth adder, a tenth adder, an eleventh adder/subtractor, and a twelfth adder, where the eleventh adder/subtractor can perform an addition or a subtraction operation according to the input mode of the switch.

A butterfly operation module can be further included, which performs a butterfly operation on output values outputted by the first inverse transform unit and the second inverse transform unit.

Another embodiment of the present invention can provide an inverse transform method for performing inverse transforms for a 2n×2n block and an n×n block (n being a natural number) with a single module, where the inverse transform method can include: performing an inverse transform operation on an even column portion of a 2n×2n block or an n×n block sharing inverse transform coefficients; and storing coefficients according to a first input mode and a second input mode and selecting coefficients according to input mode and multiplying the selected coefficients with input values to perform an inverse transform of an odd column portion of a 2n×2n block or an n×n block.

A method and apparatus for performing an inverse transform on a video codec according to an embodiment of the present invention makes it possible to perform the inverse transforms for an upper size block and a lower size block with a single inverse transform module.

Also, in performing the inverse transforms for an upper size block and a lower size block with a single inverse transform module, the hardware chip area can be reduced by 12%.

Additional aspects and advantages of the present invention will be set forth in part in the description which follows, and in part will be obvious from the description, or may be learned by practice of the invention.

BRIEF DESCRIPTION OF THE DRAWINGS

FIG. 2 schematically illustrates the structure of an inverse transformer according to an embodiment of the invention.

DETAILED DESCRIPTION

Figure 1A:
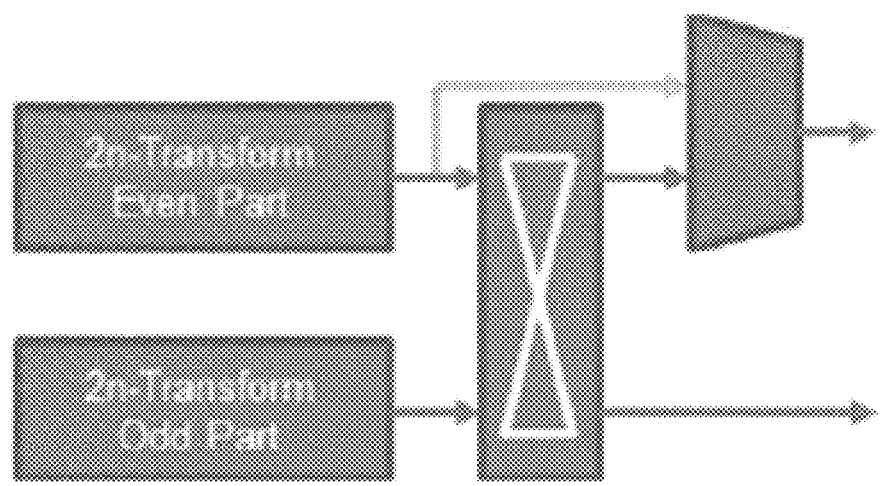
FIG. 1A and FIG. 1B illustrate the structure of a conventional inverse transformer.
Figure 1B:
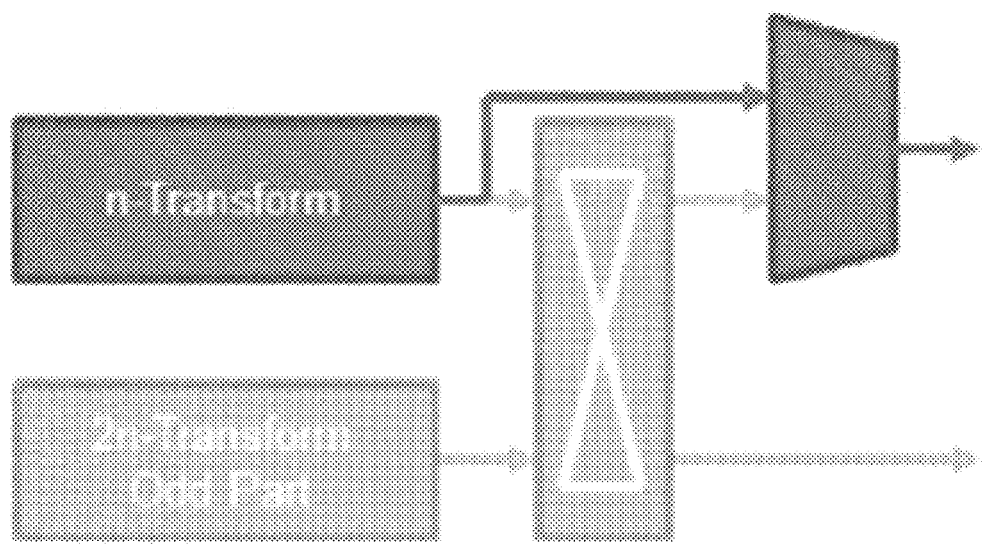

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of the invention are described below in more detail with reference to the accompanying drawings.

Figure 3:
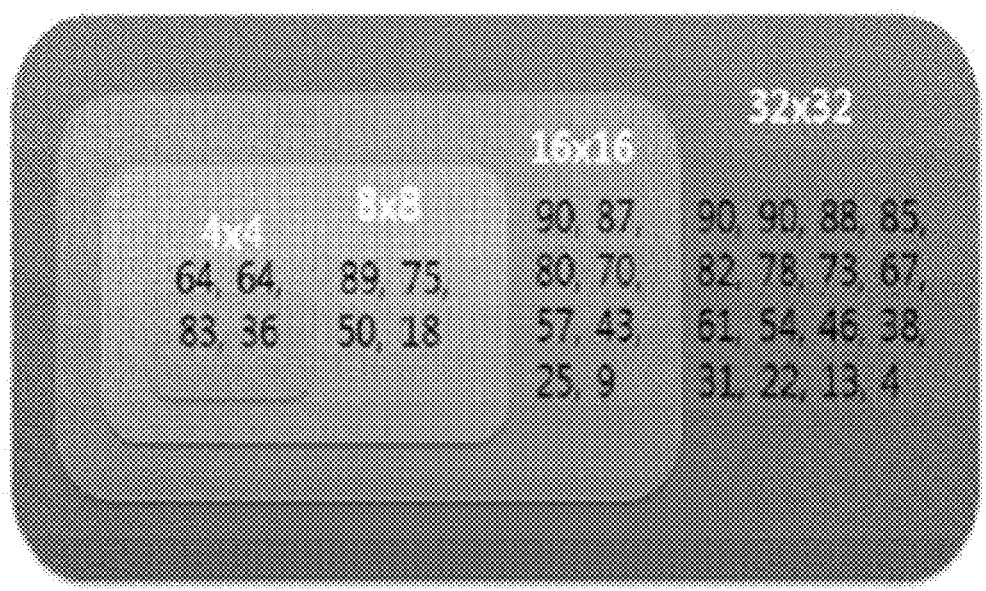
FIG. 3 illustrates inverse transform coefficients according to an embodiment of the invention.
Figure 4:
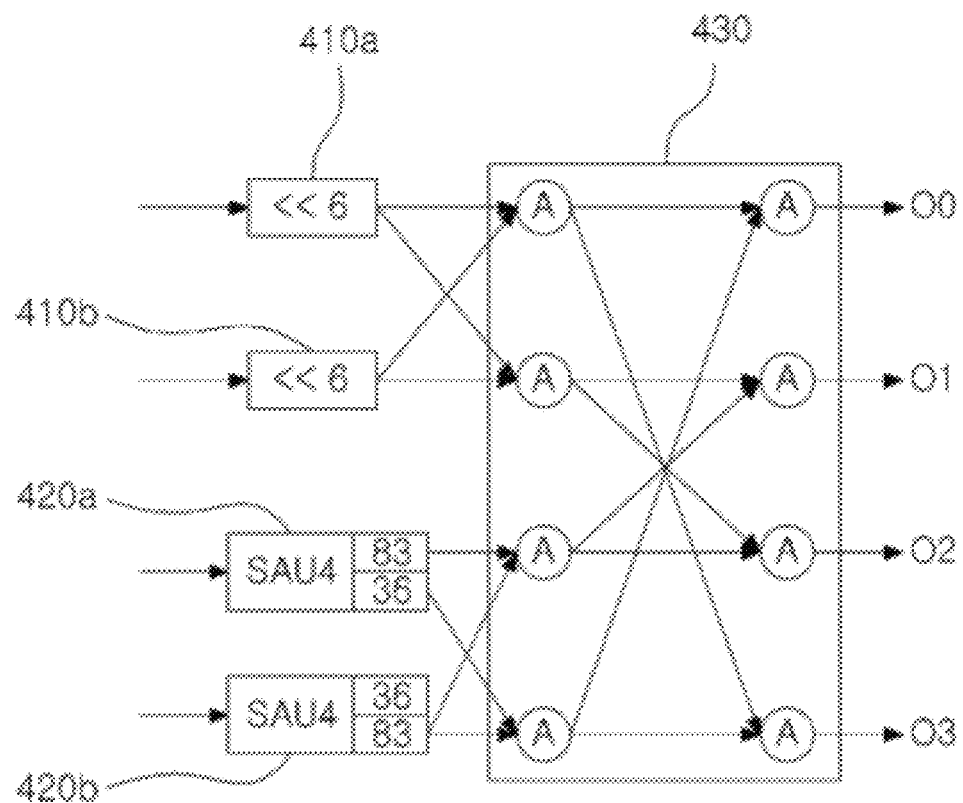
FIG. 4 illustrates the structure of a first inverse transform unit according to an embodiment of the invention.
Figure 5:
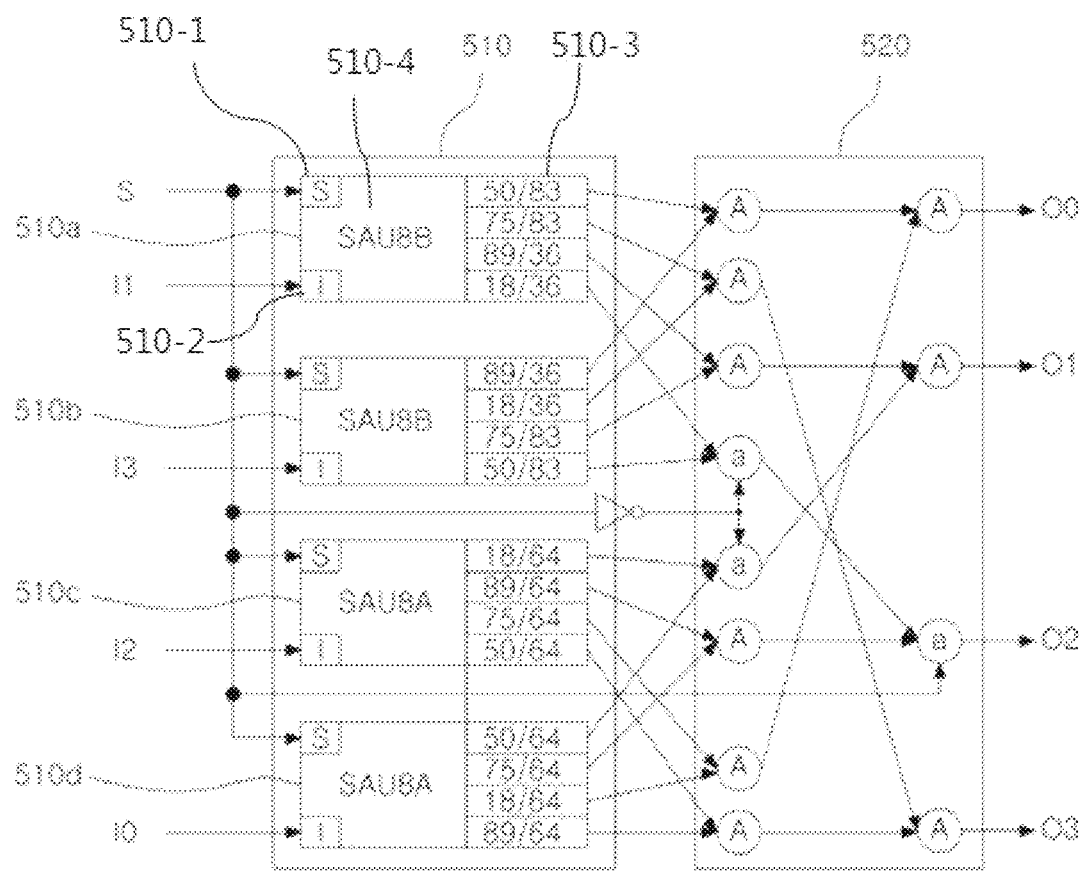
FIG. 5 illustrates the structure of a second inverse transform unit according to an embodiment of the invention.

FIG. 2 schematically illustrates the structure of an inverse transformer according to an embodiment of the invention, FIG. 3 illustrates inverse transform coefficients according to an embodiment of the invention, FIG. 4 illustrates the structure of a first inverse transform unit according to an embodiment of the invention, and FIG. 5 illustrates the structure of a second inverse transform unit according to an embodiment of the invention.

Referring to FIG. 2, an inverse transformer 200 for a video codec according to an embodiment of the invention may include a first inverse transform unit 210, second inverse transform unit 215, and a butterfly operation module/MUX 220. While an embodiment of the invention may be described using an example in which it is assumed that the butterfly operation module and the MUX are implemented in an integrated form, it is obvious that the two components can be separated into independent forms.

A video codec according to an embodiment of the invention may have a recursive architecture. That is, in a video codec according to an embodiment of the invention, the even portion of an upper-size block can have the same coefficients as all of the coefficients of a lower-size block, for a recursive architecture, during an inverse transform.

Accordingly, as illustrated in FIG. 2, an inverse transformer 200 according to an embodiment of the invention may perform an inverse transform on a block of a 2n×2n size with the even columns separated from the odd columns, in order that the inverse transform coefficients for the even column portion of the 2n×2n block can be used in the inverse transform on a lower-size block (i.e. of an n×n size).

The first inverse transform unit 210 is an element for performing an inverse transform for the even column portion of the 2n×2n block or performing an inverse transform for the n×n block. Here, n is a natural number.

As illustrated in FIG. 3, in performing an inverse transform for a 2n×2n block, it can be seen that the inverse transform coefficients for the inverse transform of the lower-size block are the same as the inverse transform coefficients for the inverse transform of the even column portion of the upper-size block.

Therefore, since the inverse transform coefficients are identical, the first inverse transform unit 210 can perform the inverse transform on the even column portion of the 2n×2n block or on the n×n block.

A more detailed structure of the first inverse transform unit 210 is illustrated in FIG. 4.

For the sake of easier understanding and convenient explanation, an embodiment of the invention is described below using an example in which n equals 4. That is, the first inverse transform unit 210 can perform an inverse transform on the even column portion of an 8×8 block and perform an inverse transform on a 4×4 block, and the second inverse transform unit 215 can perform an inverse transform on the odd column portion of the 8×8 block and perform an inverse transform on the 4×4 block.

First, the internal structure of the first inverse transform unit 210 is described below with reference to FIG. 4.

Referring to FIG. 4, the first inverse transform unit 210 may include an m number of shift registers 410a, 410b, an m number of array multipliers 420a, 420b, and an adder/subtractor unit 430. Here, m is a natural number greater than or equal to 2.

The m number of shift registers 410a, 410b are elements for shifting an input value to the left k times (where k is a natural number) as output.

For example, suppose k equals 6. The shift registers 410a, 410b may shift the input value to the left, so that the resultant effect is the same as performing a 2 k multiplication operation on the input value.

Each shift register 410a, 410b may shift the input value k times and output the result to the adder/subtractor unit 430.

As illustrated in FIG. 4, each of the array multipliers 420a, 420b can include a coefficient register for storing an m number of coefficients and can output the result of multiplying the m number of coefficients with an input value at the m-th point.

Here, the m number of coefficient registers included in each array multiplier 420a, 420b can be transform coefficients for the inverse transform of the even column portion of the 8×8 block or the 4×4 block, and for example, can be 83 and 36.

Also, as illustrated in FIG. 4, the order in which the transform coefficients are stored in each coefficient register of the first array multiplier and second array multiplier can be of an inversely symmetric structure.

That is, if the inverse transform coefficients are to be stored in the coefficient registers of the array multipliers 420a, 420b in the order of "83, 36", then the inverse transform coefficients can be stored in the coefficient registers of the array multipliers 420a, 420b in reverse order, in the order of "36, 83".

Also, the adder/subtractor unit 430 can be arranged in m columns, as illustrated in FIG. 4, with an n number of adders (a first adder through a fourth adder) arranged sequentially in each column.

The n number of adders arranged in the first column (the first adder through the fourth adder) may each add the output values (intermediate result values) outputted through the shift registers 410a, 410b in designated pairs and provide output to designated adders (a first adder through a fourth adder) of the second column.

For example, the first adder of the first column can add the intermediate result values outputted through the first shift register 410a and the second shift register 410b and provide outputs to the first adder and the fourth adder of the second column.

Also, the second adder of the first column can add the intermediate result values outputted through the first shift register 410a and the second shift register 410b and provide outputs to the second adder and the third adder of the second column.

Also, the third adder of the first column can add the intermediate result values outputted from the first points of the array multiplier 420a and array multiplier 420b and provide outputs to the second adder and the third adder of the second column.

Lastly, the fourth adder of the first column can add the intermediate result values outputted from the second points of the array multipliers 420a, 420b and provide outputs to the first adder and the fourth adder of the second column.

Then, each adder of the second column can add the intermediate result values inputted from the adders of the first column and calculate an inverse transform output value.

For example, the first adder of the second column can add the intermediate result values inputted from the first adder and the fourth adder of the first column to output an inverse transform result value. Also, the second adder and the third adder of the second column can add the intermediate result values inputted from the second adder and the third adder of the first column to output inverse transform result values. Also, the fourth adder of the second column can add the intermediate result values inputted from the first adder and the fourth adder of the first column to output an inverse transform result value.

Referring again to FIG. 2, the second inverse transform unit 215 is an element that stores coefficients for each input mode and selects the coefficients according to input for multiplying with an input value and thus performing an inverse transform.

That is, the second inverse transform unit 215 can selectively perform an inverse transform on the odd column portion of the 2n×2n block and the n×n block. As already described above, the inverse transform coefficients for performing an inverse transform is different between the odd column portion of the 2n×2n block and the n×n block. Accordingly, the second inverse transform unit 215 mush apply different inverse transform coefficients according to the input mode (i.e. according to whether the inverse transform is for the odd column portion of the 2n×2n block or for the n×n block).

To this end, the second inverse transform unit 215 can select the coefficients for an n number of array multipliers 510 for each input mode, as illustrated in FIG. 5.

FIG. 5 illustrates the detailed structure of a second inverse transform unit 215 according to an embodiment of the invention.

Referring to FIG. 5, the second inverse transform unit 215 according to an embodiment of the invention may include an n number of array multipliers 510 and an adder/subtractor unit 520.

Each array multiplier 510 may include a switch 510-1 capable of outputting a control signal according to input mode, an input buffer 510-2 for receiving an input value, a coefficient register 510-3 for selectively outputting a coefficient according to input mode, and a multiplier module 510-4, as illustrated in FIG. 5.

The switch 510-1 can selectively output each coefficient stored in the coefficient register 510-3 according to the input mode.

Then, the multiplier module 510-4 can multiply the coefficient, which was selected by the switch 510-1 according to the input mode, with the input value, to output the resultant value at the n-th point.

As illustrated in FIG. 5, each array multiplier 510 can multiply one input value with each of the n number of inverse transform coefficients designated according to the input mode and provide an output to the adder/subtractor unit 520. As a result, each of the array multipliers 510 can output resultant values at the n-th point.

For the sake of easier understanding and convenient explanation, the terms first point, second point, third point, and fourth point will be used according to the position at which an output value is outputted. That is, the output value of an n-th point represents the position at which it is outputted and is unrelated to chronological order.

Depending on the control of the switch 510-1, the coefficient register included in each array multiplier 510 can output an n number of inverse transform coefficients according to the first input mode or output an n number of inverse transform coefficients according to the second input mode.

The adder/subtractor unit 520 is an element that includes multiple adders and adder/subtractors in m columns, and receives input values (i.e. receives inputs of intermediate result values) in designated pairs and adds or subtracts the input values to output an inverse transform result value.

For example, the adder/subtractor unit 520 can include a 2(n−1) number of adders and two adder/subtractors in the first column and include an (n−1) number of adders and one adder/subtractor in the second column.

The 2(n−1) number of adders in the first column can be arranged in an inversely symmetrical structure.

That is, the (n−1) number of adders and one adder/subtractor, for adding or subtracting the intermediate result values of the first and second array multiplier 510a, 510b in designated pairs, and the (n−1) number of adders and one adder/subtractor, for adding or subtracting the intermediate result values of the third and fourth array multipliers 510c, 510d in designated pairs, may be arranged in an inversely symmetrical structure.

For example, suppose that the first adder, second adder, third adder, and fourth adder/subtractor are sequentially arranged for adding or subtracting the intermediate result values of the first and second array multiplier 510a, 510b in designated pairs. The fifth adder/subtractor, sixth adder, seventh adder, and eighth adder for adding or subtracting the intermediate result values of the third and fourth array multipliers 510c, 510d in designated pairs can be arranged sequentially in an inversely symmetrical structure.

The n-th adder and n-th adder/subtractor of the first column can receive as input the intermediate result values, which are outputted at the n-th points of the first and second array multipliers 510a, 510b, add or subtract the values, and output the result to the designated adder or adder/subtractor of the second column.

The intermediate result values outputted at the n-th points of the third and fourth array multipliers 510c, 510d can also be added or subtracted by the (n+1)-th adder and (n+1)-th adder/subtractor for output to the designated adder or adder/subtractor of the second column. Also, each adder/subtractor included in the adder/subtractor unit 520 can add or subtract input values inputted through the switch 510-1 according to input mode.

The first adder of the first column can receive and add the intermediate result values outputted at the first points of the first and second array multipliers 510a, 510b and provide output to the first adder of the second column, the second adder of the first column can receive and add the intermediate result values outputted at the second points of the first and second array multipliers 510a, 510b and provide output to the fourth adder of the second column, the third adder of the first column can receive and add the intermediate result values outputted at the third points of the first and second array multipliers 510a, 510b and provide output to the second adder of the second column, and the fourth adder of the first column can receive and add the intermediate result values outputted at the fourth points of the first and second array multiplier 510a, 510b and provide output to the third adder/subtractor of the second column.

The fifth adder/subtractor of the first column can receive and add the intermediate result values outputted at the first points of the third and fourth array multipliers 510c, 510d and provide output to the second adder of the second column, the sixth adder of the first column can receive and add the intermediate result values outputted at the second points of the third and fourth array multipliers 510c, 510d and provide output to the third adder/subtractor of the second column, the seventh adder of the first column can receive and add the intermediate result values outputted at the third points of the third and fourth array multipliers 510c, 510d and provide output to the second adder of the second column, and the eighth adder of the first column can receive and add the intermediate result values outputted at the fourth points of the third and fourth array multipliers 510c, 510d and provide output to the fourth adder of the second column.

The second column can have the first adder, second adder, third adder/subtractor, and fourth adder arranged sequentially, where the third adder/subtractor can perform an addition or a subtraction operation according to a control signal of the switch (i.e. according to input mode).

The first adder of the second column can receive and add the input values inputted from the first adder and the seventh adder of the first column to output the final inverse transform result, and the second adder of the second column can receive and add the input values inputted from the third adder and the fifth adder of the first column to output the final inverse transform result. Also, the third adder of the second column can receive and add the input values inputted from the fourth adder and the sixth adder of the first column to output the final inverse transform result, and the fourth adder of the second column can receive and add the input values inputted from the second adder and the eighth adder of the first column to output the final inverse transform result.

Thus, the second inverse transform unit 215 can multiply the input values with the coefficients selected according to input mode using the n number of array multipliers, and add or subtract the values in designated pairs, to selectively perform an inverse transform for the odd column portion of the 2n×2n block or the n×n block.

Referring again to FIG. 2, the butterfly operation module/MUX 220 is an element for performing a butterfly operation on the result values obtained by the inverse transforms performed by the first inverse transform unit 210 and the second inverse transform unit 215. The butterfly operation is well known to those skilled in the art and thus is not described here in detail.

Table 1 compares an inverse transformer according to an embodiment of the invention with an inverse transformer according to the related art. To derive the results of Table 1, a design version was used with the support of the CAD tool of IDEC for a 0.18 um process under the same conditions, to compare the gate size.

TABLE 1

|  | Present Invention | Related Art | Gain |
| --- | --- | --- | --- |
| Size (Gate) | 9966 | 11268 | 12 |
| Operating Speed (MHz) | 300 | 300 | — |

By having the inverse transform for a 2n×2n block and the inverse transform for an n×n block performed by a single inverse transform module as in an embodiment of the invention, the chip area of the inverse transformer can be reduced by 12%, as shown in Table 1.

A method of performing an inverse transform for a video codec according to an embodiment of the invention can be implemented in the form of program instructions that may be performed using various means for electronically processing information, and can be recorded in a computer-readable medium. Such a computer-readable medium can include program instructions, data files, data structures, etc., alone or in combination.

Examples of the program of instructions may include not only machine language codes produced by a compiler but also high-level language codes that can be executed through the use of an interpreter, etc., by a device for electronically processing information, for example a computer.

The hardware mentioned above can be made to operate as one or more software modules that perform the actions of the embodiments of the invention, and vice versa.

While the present invention has been described above using particular examples, it is to be appreciated that various modifications and alterations can be made from the disclosures above by a person having ordinary skill in the art without departing from the spirit and scope of the invention.

What is claimed is:

1. An inverse transformer capable of performing inverse transforms for a 2n×2n block and an n×n block (where n is a natural number) with a single module, the inverse transformer comprising:
   a first inverse transform unit configured to perform an inverse transform operation on one of an even column portion of a 2n×2n block and an n×n block sharing inverse transform coefficients;
   a second inverse transform unit configured to store coefficients according to a first input mode and a second input mode and configured to select coefficients according to input mode and multiply the selected coefficients with an input value to perform an inverse transform of an odd column portion of a 2n×2n block or an n×n block; and
   a butterfly operation module configured to perform a butterfly operation on output values outputted by the first inverse transform unit and the second inverse transform unit, wherein:
   the second inverse transform unit includes:
      a coefficient register configured to store an n number of coefficients for each of the first input mode and the second input mode;
      a switch configured to selectively output the n number of coefficients for the first input mode or the second input mode from the coefficient register according to input mode;
      an n number of array multipliers configured to multiply the n number of coefficients selectively outputted by the switch with the input value and output intermediate values at an n-th point; and
      an adder/subtractor unit configured to add or subtract the intermediate values an m number of times (where m is a natural number) to output a final inverse transform result, and
   the coefficient register, the switch, the array multipliers, and the adder/subtractor unit are included in a single module.

2. The inverse transformer of claim 1, wherein the input modes comprise a first input mode for an inverse transform of a 2n×2n block and a second input mode for an inverse transform of an n×n block.

3. The inverse transformer of claim 1, wherein the adder/subtractor unit comprises a plurality of adders and adder/subtractors arranged in m columns,
   wherein the adder/subtractor performs an addition or a subtraction operation according to the input mode of the switch.

4. The inverse transformer of claim 3, wherein the adder/subtractor unit has a first adder, a second adder, a third adder, and a fourth adder/subtractor arranged in a first column for adding or subtracting the intermediate values outputted at the n-th points by a first and a second array multiplier, and has a fifth adder/subtractor, a sixth adder, a seventh adder, and an eighth adder arranged for adding or subtracting the intermediate values outputted at the n-th points by a third and a fourth array multiplier.

5. The inverse transformer of claim 4, wherein an n-th adder or adder/subtractor of the first column adds or subtracts the intermediate values outputted at the n-th point of the first and the second array multiplier or the third and the fourth array multiplier as a pair and outputs a result to a designated adder or adder/subtractor of the second column.

6. The inverse transformer of claim 5, wherein the second column of the adder/subtractor unit includes a ninth adder, a tenth adder, an eleventh adder/subtractor, and a twelfth adder, and
   the eleventh adder/subtractor performs an addition or a subtraction operation according to the input mode of the switch.

* * * * *